(No Model.) 2 Sheets—Sheet 1.
J. H. MAN.
SUGAR CANE CRUSHING MILL.
No. 375,679. Patented Dec. 27, 1887.
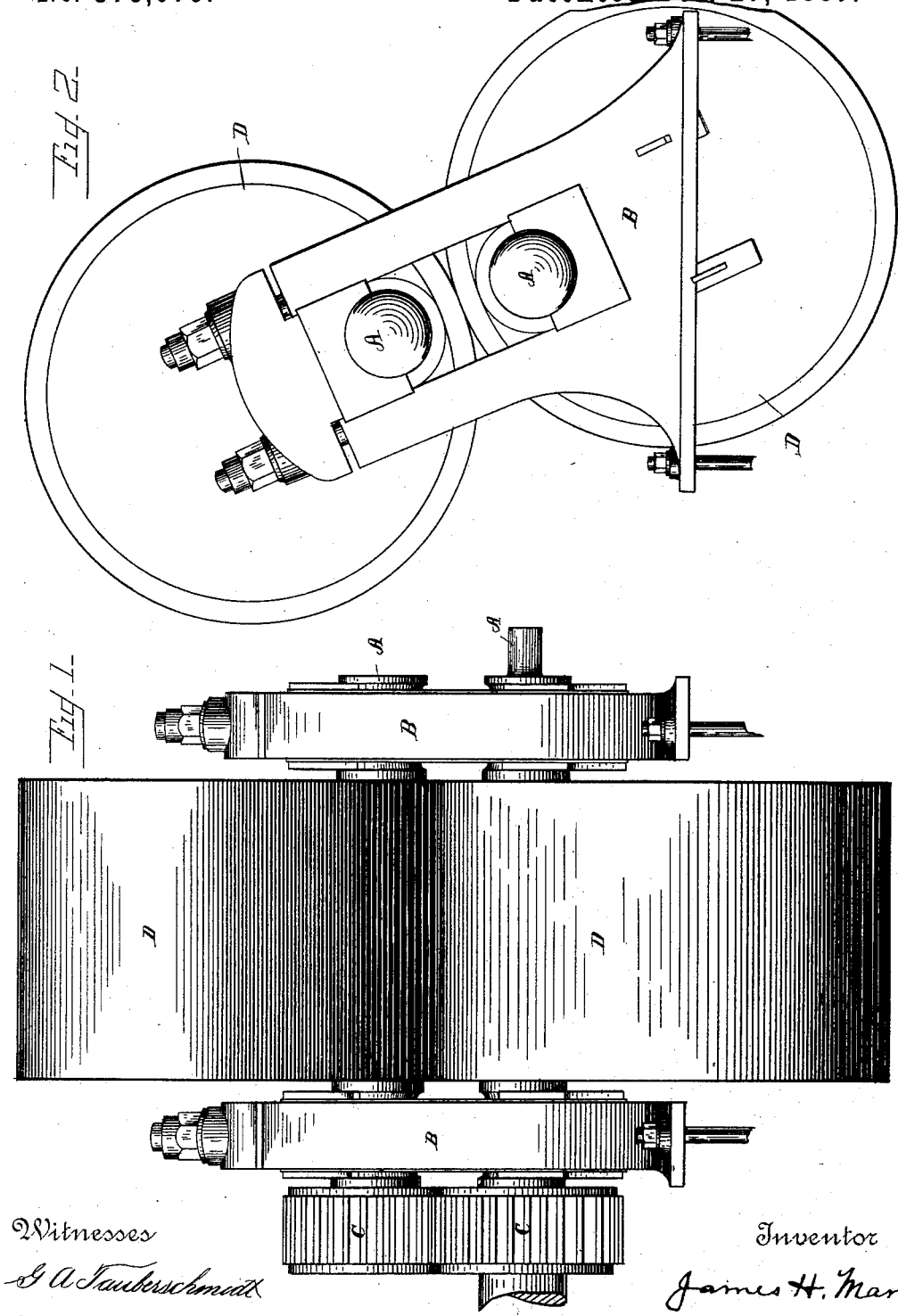

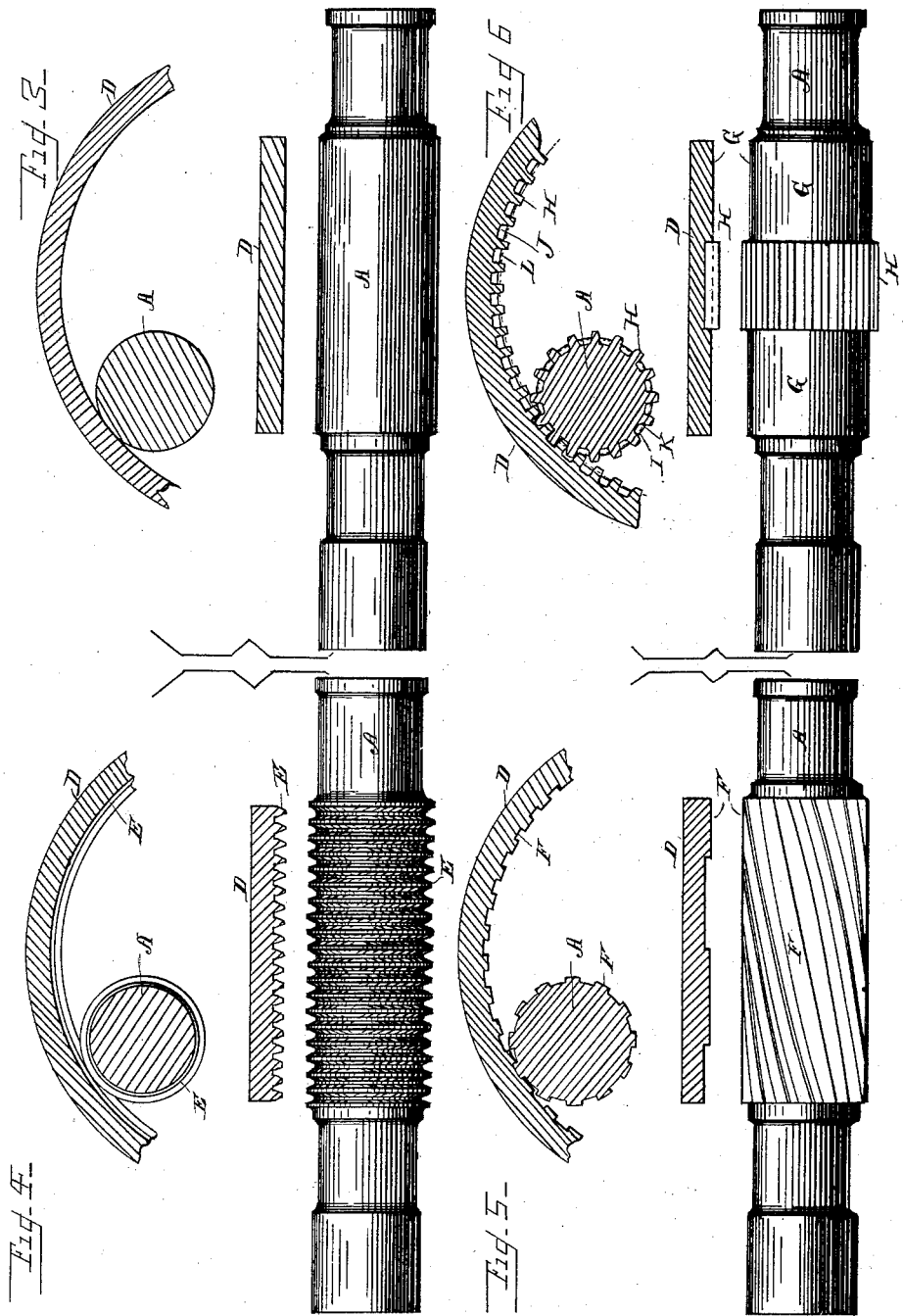

UNITED STATES PATENT OFFICE.

JAMES HENRY MAN, OF DENVER, COLORADO, ASSIGNOR OF ONE-HALF TO FRANKLIN FARRELL, OF ANSONIA, CONNECTICUT.

SUGAR-CANE-CRUSHING MILL.

SPECIFICATION forming part of Letters Patent No. 375,679, dated December 27, 1887.

Application filed April 18, 1887. Serial No. 235,186. (No model.)

*To all whom it may concern:*

Be it known that I, JAMES HENRY MAN, a citizen of Great Britain, residing at Denver, in the county of Arapahoe and State of Colorado, have invented certain new and useful Improvements in Sugar-Cane-Crushing Mills; and I do hereby declare the following to be a full, clear, and exact description of the invention, such as will enable others skilled in the art to which it appertains to make and use the same.

My invention relates to improvements in mills for extracting the juice from cane, sorghum, and other like substances.

The invention consists, generally, in the combination of a pair of hollow headless cylinders or rings and a pair of shafts geared together and arranged to make contact with the internal surface of the rims of the cylinders, whereby the diameters of the crushing-cylinders may be largely augmented to facilitate feeding and crushing the canes without otherwise increasing the dimensions and weight beyond that of the two or three roller-machines now in use.

In the drawings, Figure 1 is an end elevation of the mill. Fig. 2 is a side elevation of the same. Fig. 3 is a view in elevation and section showing one form of construction in detail. Fig. 4 is a similar view showing a second form of construction in detail. Fig. 5 is a similar view showing a third form of construction in detail. Fig. 6 is a similar view showing a fourth form of construction in detail.

Similar letters of reference designate the same parts in each and every figure.

Two shafts or axles, A A, revolve in and are supported by two frames, B B, fitted with adjustable bearings. These shafts can be placed vertically one over the other, or are set at an angle, as shown, and they are geared together by pinions C C for transmitting motion from one shaft to the other, either shaft being adapted to receive power from any prime mover. Placed about these shafts A A are two rings or hollow cylinders, D D, and the arrangement is such that when the shafts A A revolve they draw in between them the two rings D D.

There are various other methods whereby motion is transmitted from the shafts to their rings, respectively, as will be hereinafter more fully described.

One way of transmitting the required motion is, as shown in detail in Fig. 3, by the friction of the surfaces of contact between the shaft and the ring which are true cylinders, and when in operation the mutual friction caused by the enormous pressure in crushing the canes is sufficient to insure a transmission of the motion.

Another way of transmitting the required motion is by the friction between engaging V-shaped grooves, as shown in detail in Fig. 4. The body of the shaft and the inner surface of the ring are formed with a series of V-shaped grooves, E E, that fit into each other, respectively, and by the pressure employed, insure ample friction for the transmission of the motion.

Another way of transmitting the required motion is by the employment of cogs, as shown in detail in Fig. 5. On the body of the shaft and inner surface of the ring are formed shallow grooves F F, cut on the spiral or "rifle" system. These grooves and corresponding projections fit into each other, respectively, and being formed so that their outer and inner surfaces are portions of true cylinders they bottom each other, respectively, and insure a perfect and regular motion, which is one of rolling contact.

Another way of transmitting the required motion is by the employment of cogs in combination with plain cylindrical surfaces, as shown in detail in Fig. 6. The plain cylindrical surfaces G G are preferably formed at each end of the shaft and ring with the cogs H H in between the cylindrical surfaces G G. By this means rolling contact is assured, and the cogs H H are preferably common cast gears that do not fill or bottom, as in Fig. 5.

The diameters of the cylindrical surfaces, both of the shaft and ring, are preferably made slightly larger than the pitch circles of the gear-wheels, respectively. The circles I and J, representing the cylindrical surfaces, are larger than the dotted circles K and L, representing the pitch circles of the gear-wheels, respectively, such that when in operation the rolling contact between the cylindrical surfaces causes the rings to travel at a slightly greater speed than that designated by the gears, and reduces the pressure on the driving sides of the cogs.

It is observed that the design and size of the mill generally is not affected by the size of the rings, and as there is no practical limit to the size of the rings the problem of obtaining the rolling surfaces, having the gradually-increasing grip of large cylinders, is solved by my invention.

Having described my invention, I claim—

1. In a sugar-cane-crushing mill, the combination of a pair of headless hollow crushing cylinders or rings, a pair of shafts geared together and arranged to make contact with the internal surface of the rims of said cylinders, substantially as described.

2. In cane-crushing mills, the combination of a pair of headless hollow crushing cylinders and a pair of driven shafts, the cylinders being supported in proximity to each other and driven by said shafts, as set forth.

3. In cane-crushing mills, the combination of a suitable frame, a pair of shafts, and a pair of headless hollow cylinders mounted on and actuated by the shafts, as specified.

4. In sugar-cane-crushing mills, the combination of a suitable frame, a pair of shafts geared together, and a pair of headless hollow cylinders, each shaft and its cylinder being geared together, substantially as described.

5. In cane-crushing mills, the combination of a pair of headless hollow cylinders provided with internal cogs and a pair of shafts upon which the cylinders are mounted having cogs to intergear with those of the cylinders, substantially as described.

In testimony whereof I affix my signature in presence of two witnesses.

JAMES HENRY MAN.

Witnesses:
M. J. SPALDING,
E. D. WILLS.